United States Patent [19]
Walton et al.

[11] Patent Number: 4,989,643
[45] Date of Patent: Feb. 5, 1991

[54] HIGH PERFORMANCE COMPOSITE HOSE

[75] Inventors: James C. Walton, Princeton; Thomas S. Moroney, Acton; William McNamara, Clinton; Donald G. Morgan, Hudson; Arunas T. Simkus, North Oxford, all of Mass.

[73] Assignee: Chase-Walton Elastomers, Inc., Hudson, Mass.

[21] Appl. No.: 287,409

[22] Filed: Dec. 20, 1988

[51] Int. Cl.⁵ ............................................. F16L 9/14
[52] U.S. Cl. .................................... 138/126; 138/124; 138/125
[58] Field of Search ............... 138/110, 123, 124, 125, 138/126, 172, 174, 121

[56] References Cited

U.S. PATENT DOCUMENTS

| | | | |
|---|---|---|---|
| 834,074 | 10/1906 | Patterson | 138/124 |
| 1,343,368 | 6/1920 | Kinsley | 138/126 |
| 1,628,832 | 5/1927 | Folor | 138/126 |
| 2,515,929 | 7/1950 | Ofehdt | 138/124 |
| 2,836,181 | 5/1958 | Tapp | 138/123 |
| 2,984,262 | 5/1961 | Aysumi et al. | 138/126 |
| 3,073,353 | 1/1963 | Rittenhouse | 138/124 |
| 4,159,027 | 6/1979 | Caillet | 138/123 |
| 4,273,160 | 6/1981 | Lowles | 138/125 |
| 4,559,782 | 12/1985 | Ritchey et al. | 138/126 |
| 4,576,205 | 3/1986 | Morinaga et al. | 138/98 |
| 4,577,736 | 3/1986 | Bongers et al. | 138/123 |
| 4,600,615 | 7/1986 | Hyodo et al. | 428/36 |
| 4,734,305 | 3/1988 | Sugimoto et al. | 138/126 |

Primary Examiner—James E. Bryant, III
Attorney, Agent, or Firm—Weingarten, Schurgin, Gagnebin & Hayes

[57] ABSTRACT

A high performance composite hose having enhanced durability, reliability and longevity for use in high pressure, high temperature and/or vibrational environments such as turbocharged truck, bus, automobile, marine and generating engines. The composite hose comprises one or more plies of balanced fabric having a high performance elastomer adhered to the inner and outer surfaces of each fabric ply. The balanced fabric is formed as woven sheets from filament yarns resistant to high temperatures. Balanced fabric sheets are sectioned at a predetermined angle to the filament yarns to form balanced fabric plies. The yarns of the balanced fabric plies are orientated at the predetermined angle with respect to the longitudinal axis of the composite hose such that the composite hose has a predetermined longitudinal flexibility to compensate for stress effects resulting from high temperatures, high pressures and/or vibrations. Concomitantly, the balanced fabric plies restrict the radial flexibility of the composite hose to preclude collapse or ballooning of the hose during start up, irregular or steady state operation.

18 Claims, 1 Drawing Sheet

4,989,643

HIGH PERFORMANCE COMPOSITE HOSE

FIELD OF THE INVENTION

This invention relates generally to hoses, and more particularly to a high performance composite hose for use in high pressure, high temperature and/or high vibrational environments such as turbocharged engine systems.

BACKGROUND OF THE INVENTION

Hoses for use in systems operating at high temperatures or high pressures and/or in high vibrational environments must possess certain characteristics for satisfactory performance in such environments, thereby precluding premature failure of the hoses due to the severe operating conditions. For example, it has been found that the performance of turbocharged internal combustion engines may be enhanced through the use of charge air cooling systems.

Charge air cooling systems provide cooler, denser air to the engine to achieve more complete combustion. Increased combustion efficiency improves fuel economy by 2-10 percent over conventional cooling methods, lowers engine emission levels and greatly increases engine component reliability.

In charge air cooling systems, ambient air is compressed in the turbocharger and directed through ducting to a heat exchanger. The heat exchanger utilizes ram air generated by vehicle movement to cool the charge air which is then directed through ducting to the engine via a bypass blower.

The charge air from the turbocharger has a temperature in excess of 300° F. and is ram cooled to a temperature in the range of 110° F. The cooled charge air is extremely dense air. Thus, it is readily apparent that hose utilized in ducting such systems must be capable of maintaining mechanical strength and integrity under high temperatures and pressures.

In charge air systems as described above, the turbocharger and heat exchanger are mounted on different portions of the system, each of which is subjected to different three-dimensional vibrations. Thus, hose utilized as ducting in such systems must also possess a certain degree of flexibility to preclude the hose from being subjected to fatigable strain due to three-dimensional vibrations in disparate planes.

Such flexibility in the hose, however, should be limited to compensating for the strain effects resulting from high temperatures and pressure and three-dimensional vibrations without adversely degrading the structural strength and integrity of the hose. Generally this requires that such hose should be capable of a predetermined degree of flexibility along the longitudinal axis of the hose while being substantially impervious to radial expansion and contraction to preclude ballooning or collapse of the hose during start up, irregular or steady state operation of the system.

In addition to the severe operating environments encountered in turbocharged truck, bus, automobile, marine and stationary engines as exemplarily described hereinabove, it will be appreciated that similar severe conditions exist in other hose applications.

It is known in the art to utilize hoses fabricated from metal in systems operating at high temperatures and/or high pressures and/or subjected to severe vibrational stresses. While metallic hoses possess good mechanical strength and integrity, such hoses must be fabricated to a high degree of precision to prevent misalignments, making such hoses relatively costly. In addition, metallic hoses can be disadvantageous in high vibrational environments. While the hoses themselves may or may not experience debilitating vibrational stresses, the hoses will transmit vibrational stresses to adjacent system components.

It is also known in the art to provide shaped hoses formed from natural or synthetic rubbers for use in such severe operating environments. Shaped hoses include one or more convoluted sections to provide the requisite degree of flexibility in the hose. However, even though shaped hoses are fabricated as integral units, structural discontinuities exist at the interfaces between the convoluted sections and the tubular sections of the hose. The stresses experienced by shaped hoses are concentrated at these discontinuities which increases the probability of premature failure at these points. To provide improved reliability and longevity, shaped hoses may be fabricated with wall dimensions larger than required for the operating conditions, but at the expense of increased costs and decreased flexibility.

It is also known in the art to use reinforcing elements in hoses formed of natural or synthetic rubbers to improve the durability, reliability and longevity thereof. Reinforcing elements may include filaments of natural or synthetic fibers or metal, natural or synthetic fabrics and metallic mesh.

Filaments of natural or synthetic fibers or metal may be wound between layers of natural or synthetic rubber to provide a hose with increased mechanical strength. The filament windings restrict the radial flexibility of the hose. These windings, however, are generally ineffective in controlling the longitudinal flexibility of the hose. Furthermore, filaments of natural or synthetic fibers such as cotton, wool, nylon, polyester and dacron are adversely affected by high temperature environments.

Filaments formed from materials such as fiberglass have a tendency to fragment in high vibrational environments. Fiberglass fragments will lacerate adjoining rubber layers, leading to premature hose failure. Metallic filaments likewise have a tendency to lacerate adjoining rubber layers. Lacerating effects may be mitigated by encasing such filaments between fabric layers. However, such hoses require additional costs and time to fabricate and may result in hoses of unnecessarily large dimension and weight.

Filaments of natural or synthetic fibers may be woven as fabrics which are then utilized as laminations between layers of natural or synthetic rubber. Fabrics woven from filaments of natural or synthetic fibers such as cotton, wool, nylon, polyester and dacron are adversely affected by high temperature environments.

Moreover, as illustrated in U.S. Pat. Nos. 4,600,615 and 4,576,205, the warps and wefts of the woven fabric are generally orientated longitudinally and radially perpendicular to the axis of the hose which presents difficulty in achieving the requisite horizontal flexibility in combination with restricted radial flexibility. A proper balance in flexibility may be achieved by utilizing different filament yarns in warp and weft, by coiling right-handed and/or left-handed fiber yarn about the warp and weft fibers and/or coiling crimped yarns about the warp and/or weft fibers. This, however, increases the complexity and cost of the woven fabric as well as resulting in a hose of increased weight.

Metallic mesh may be utilized as a reinforcing layer between layers of natural or synthetic rubber to provide hoses of high mechanical strength. Metallic mesh, however, severely restricts the flexibility of the hose both longitudinally and radially. In addition, metallic mesh likewise has a tendency to lacerate adjoining rubber layers. Lacerating effects may be mitigated by encasing such mesh between fabric layers. However, such hoses require additional costs and time to fabricate and may result in hoses of unnecessarily large dimension and weight.

SUMMARY OF THE INVENTION

A high performance composite hose having enhanced durability, reliability and longevity for use in high pressure, high temperature and/or vibrational environments such as turbocharged truck, bus, automobile, marine and stationary engines. The composite hose comprises one or more reinforcing plies of balanced fabric having high performance elastomer bonded to the inner and outer surfaces of each reinforcing ply.

The balanced fabric is formed as woven sheets from filament yarn possessing good textile properties, dimensional stability, and resistance to high temperatures. Filament yarns of the aramid family are representative of filament yarns having utility in forming the balanced fabric of the present invention. A balanced fabric is one wherein the warp and weft of the fabric possess approximately the same break strength. The balanced fabric sheets are subsequently sectioned at a predetermined angle to the warp/weft of the fabric to form individual balanced fabric reinforcing plies for the composite hose.

Each reinforcing ply of the composite hose is coaxially disposed about the longitudinal axis of the hose and orientated so that the warp/weft of the balanced fabric has a predetermined angle of orientation with respect to the longitudinal axis of the composite hose such that the composite hose possesses the requisite degree of longitudinal flexibility for high temperature, high pressure and/or vibrational environments. The preferred angle of orientation of the warp/weft of the balanced fabric is between 39 and 45 degrees.

Each reinforcing ply of balanced fabric is treated to ensure proper bonding with the superposed high performance elastomer. The composite hose of the present invention may consist of one to eight reinforcing plies of balanced fabric. A composite hose for use in the high temperature, high pressure and/or high vibrational environments experienced in turbocharged systems preferably comprises three or four reinforcing plies of balanced fabric.

Each reinforcing ply of balanced fabric has a high temperature elastomer bonded to the inner and outer surfaces thereof. Suitable high performance elastomers include silicone rubber, EPM or EPDM elastomers, fluorinated elastomers and ethylene-acrylic elastomers. The internal layers of high performance elastomer cushion and separate adjacent reinforcing Plies of balanced fabric.

In one embodiment, the innermost layer of high performance elastomer is skim coated on the inner surface of the innermost reinforcing ply. The skim coated elastomeric layer provides a high performance seal when the composite hose is interfaced with a particular operating system.

In addition to forming composite hoses of constant inner and outer diameters, a composite hose according to the present invention may also be formed as a shaped composite hose with one or more convoluted sections The convoluted sections provide an extra degree of flexibility in high temperature, high pressure and/or high vibrational environments. The reinforcing plies of balanced fabric interposed between bonded layers of a high performance elastomer control the stress experienced at the discontinuity between the convoluted sections and the tubular sections of the composite hose to enhance the flex life of the composite hose.

BRIEF DESCRIPTION OF THE DRAWINGS

A more complete understanding of the present invention and the attendant advantages and features thereof will be more readily understood by reference to the following detailed description when considered in conjunction with the accompanying drawings wherein.

DETAILED DESCRIPTION OF PREFERRED EMBODIMENTS

High performance composite hoses according to the present invention are fabricated to have utility in high pressure, high temperature and/or high vibrational environments. By way of illustration only, hoses utilized in turbocharged engine systems are subjected to a range of temperatures from approximately $-54°$ C. ($-65°$ F.) to approximately $260°$ C. ($500°$ F.). Depending upon the fluid flow rate to be handled by the hose, the hose may be subjected to range of pressures from about 175 psi (6 inch I.D.) to about 500 psi (1 inch I.D.).

In typical turbocharged engine systems, hoses are subjected to large stresses transmitted from different vibrational environments. One end of the hose is coupled to the turbocharger unit mounted on the engine while the other end of the hose is coupled to a heat exchanger mounted on a separate structural member. For example, in automotive applications the heat exchanger is typically mounted to the vehicle chassis. As such, one end of the hose will be subjected to essentially periodic three dimensional vibrations due to combustion and mechanical operation of the engine while the other end of the hose is subjected to random three dimensional vibrations due to aerodynamic effects and road-induced impacts.

A composite hose according to the present invention may include from one to eight reinforcing plies of balanced fabric, with each reinforcing Ply of balanced fabric having layers of high performance elastomer bonded to the inner and outer surfaces thereof. The number of reinforcing plies is generally determined based upon the operating environment in which the composite hose is utilized.

For example, a composite hose having a single reinforcing ply of balanced fabricate has utility in low pressure operating environments. The inventors have recognized that a composite hose formed with eight plies of balanced fabric represents a practical upper limit for hoses utilized in high pressure, high temperature and/or high vibrational environments due to the mechanical rigidity of the hose. A composite hose having more than eight plies of balanced fabric would not possess the requisite degree of mechanical flexibility for use in high temperature, high pressure and/or high vibrational environments. Such hoses are inherently mechanically rigid and would be subject to premature failure due to induced stresses from three-dimensional vibrations. For turbocharged engine applications, it has been determined that composite hoses having three or four reinforcing plies of balanced fabric are most suitable, providing the requisite longitudinal flexibility and good mechanical strength and integrity.

Figure 1:
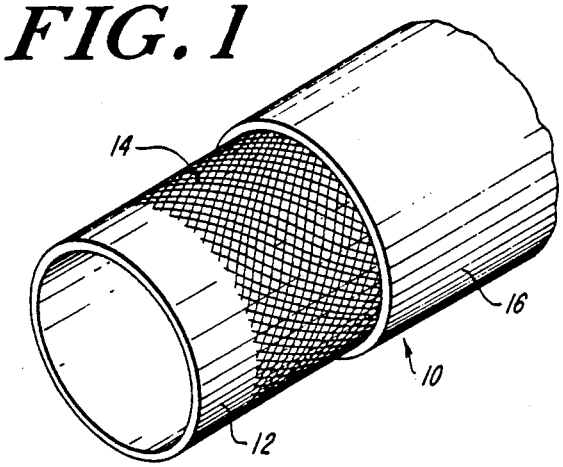
FIG. 1 is a partially broken perspective view of one exemplary embodiment of a composite hose according to the present invention.

Referring now to the drawings wherein like reference numerals designate corresponding or similar elements throughout the several views, there is exemplarily illustrated in FIG. 1 a partial perspective of one embodiment of a composite hose 10 according to the present invention. The composite hose 10 of FIG. 1 is a single-ply hose having layers of high performance elastomer 12, 16 bonded to the inner and outer surfaces of an intermediate reinforcing ply of balanced fabric 14. The embodiment of FIG. 1 is presented to simplify the explication of the features of high performance composite hoses according to the present invention, but is not intended to be limiting.

High performance elastomers are used to form the elastomeric layers 12, 16 bonded to the reinforcing ply of balanced fabric 14. High performance elastomers are elastomers which experience little or no change in properties when subjected to high temperature environments. Representative examples of high performance elastomers having utility in the formation of composite hoses according to the present invention include silicone elastomers, EPM or EPDM elastomers (EPM and EPDM, respectively, are acronyms for ethylene-propylene monomers and ethylene-propylene diene monomers, which are ethylene-propylene terpolomers);, ethylene-acrylic elastomers and fluorinated elastomers.

The reinforcing ply of balanced fabric 14 is treated to ensure proper bonding with the high performance elastomeric layers 12, 16. The ply of balanced fabric 14 is washed or dipped in a commercially available priming agent to facilitate substantially complete and uniform bonding of the layers of high Performance elastomer 12, 16 to the reinforcing ply of balanced fabric 14. By way of example only, silane diluted in methanol has utility as a priming agent to ensure that the reinforcing ply of balanced fabric 14 bonds in a satisfactory manner with the inner and outer layers of elastomer 12, 16.

After the reinforcing ply of balanced fabric 14 has been treated with the priming agent, the inner and outer layers of elastomer 12, 16 are applied to the reinforcing ply of balanced fabric 14 by conventional techniques to form the composite hose 10 and low compression set, for example at 175° C. for 22 hours, to final configuration. Composite hoses according to the present invention possess good adhesion strength. Composite hoses subjected to destructive testing typically experienced cohesive failure, that is, failure of the elastomeric layers before separation of the reinforcing plies of balanced fabric.

Preferably, the inner layer of elastomer 12 forming the inner diameter of the composite hose 10 is skim coated onto the reinforcing ply of balanced fabric 14. Hoses utilized in high pressure, high temperature and/or high vibrational environments are typically interfaced into the operating system by being fitted onto tubular projections and secured thereto by means of clamps. With clamping pressures of about 38 to about 45 inch-pounds, the skim-coated inner layer of elastomer 12 elastically deforms to provide a fluid-tight seal with the tubular projections.

Figure 2:
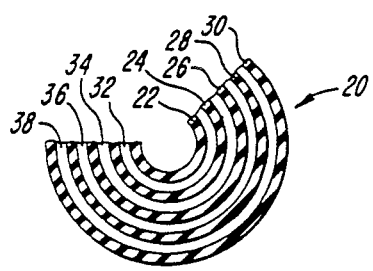
FIG. 2 is a cross sectional view of another exemplary embodiment of a composite hose according to the present invention.

Another exemplary embodiment of a composite hose 20 according to the present invention is illustrated in FIG. 2. The composite hose 20 is a four-ply hose having layers of high performance elastomer 22, 24, 26, 28, 30 bonded to the inner and outer surfaces of corresponding reinforcing plies of balanced fabric 32, 34, 36, 38. The intermediate elastomeric layers 24, 26, 28 cushion and separate the reinforcing plies of balanced fabric 32, 34, 36, 38. An elastomeric layer is required between adjacent plies of balanced fabric inasmuch as contacting fabric plies would be subjected to destructive abrading effects due to induced stresses.

The reinforcing plies of balanced fabric 32, 34, 36, 38 are individually treated with a priming agent as disclosed hereinabove. The innermost elastomeric layer 22 is preferably skim coated to the inner surface of the innermost reinforcing ply of balanced fabric 32 to provide the sealing capability disclosed hereinabove.

Figure 3A:
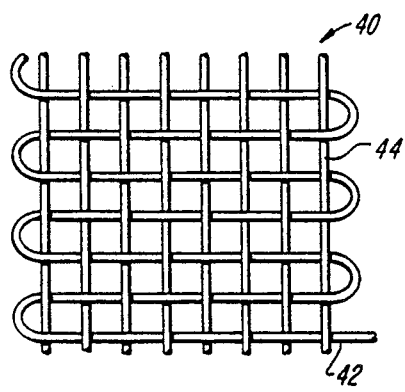
FIG. 3A is a partial schematic plan view illustrating a woven sheet of balanced fabric according to the present invention.

Referring now to FIG. 3A, there is shown a partial schematic representation of a woven sheet of balanced fabric 40 according to the present invention. The balanced fabric 40 is formed by warps 42 and wefts 44 of filament yarn or thread. The filament yarns for the warp and weft may have a predetermined number of twists per inch. The present invention contemplates the use of filament yarns which are stable in high temperature operating environments such that the balanced fabric 40 provides dimensional stability and does not melt, flow or degrade over the projected temperature operating range. Filament yarns of the aramid family are especially suitable for use in forming the balanced fabric of the present invention.

For example, filament yarns of aromatic polyamide fibers of the aramid family such as NOMEX (poly(m-phenylene terphthalamide), a registered trademark of the E.I. du Pont De Nemours and Company, may be used to form the woven sheets of balanced fabric according to the present invention. Another aromatic polyamide fiber of the aramid family such as KEVLAR, a registered trademark of the E.I. du Pont De Nemours and Company, is also a suitable filament Yarn for forming the woven sheets of balanced fabric 40 of the present invention.

The balanced fabric 40 of FIG. 3A is formed so that the warps 42 and wefts 44 have approximately the same break strength. In one exemplary embodiment of the balanced fabric 40 according to the present invention, the warps 42 are formed from NOMEX filament yarn having a break strength of approximately 862 grams and the wefts 44 are formed from NOMEX filament yarn having a break strength of approximately 816 grams.

Further, the warp 42 of the balanced fabric 40 has about 40 picks or ends per inch, a denier of about 386, a twist of about 12 s, a percent elongation of about 22, a tenacity of about 2.15 gpd, a modulus of elasticity of about 17 gpd, a work to break of about 139 gpd and a toughness of about 0.35 gpd. The corresponding weft 44 has about 38 picks or ends per inch, a denier of about 380, a twist of about 11.6 s, a percent elongation of about 20, a tenacity of about 2.07 gpd, a modulus of elasticity of about 28 gpd, a work to break of about 115 gpd and a toughness of about 0.29 gpd.

Figure 3B:
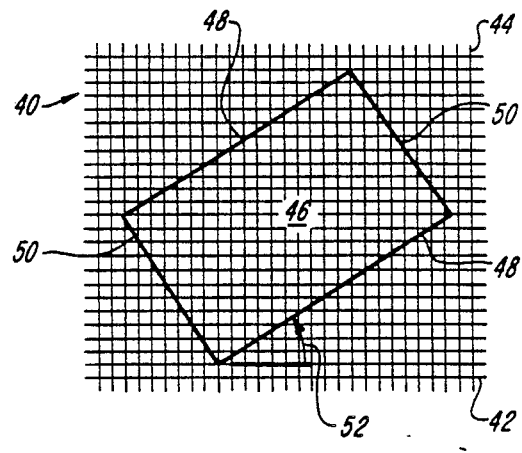
FIG. 3B illustrates the formation of a ply of balanced fabric as sectioned from the woven sheet of balanced fabric of FIG. 3A.

By sectioning the woven sheets of balanced fabric 40 in a predetermined manner as hereinafter described, individual reinforcing plies of balanced fabric 46 for use in forming high performance composite hoses are readily formed. Referring to FIG. 3B, each specific reinforcing ply of balanced fabric 46 is formed by making specific section line cuts 48, 48, 50, 50 in the woven sheets of balanced fabric 40.

As depicted in FIG. 3B, the section line cuts 48, 48 are made at a predetermined angle 52 with respect to the warp 42 of the balanced fabric 40. A high performance composite hose according to the present invention having the requisite degree of longitudinal flexibility is produced by section line cuts 48, 48 having a predetermined angle 52 from about 39 degrees to about 45 degrees.

The section line cuts 50, 50 are generally made at right angles to the section line cuts 48, 48 to define each individual reinforcing ply 46. For multi-ply composite hoses, the individual reinforcing plies 46 are of differing sizes, with the innermost reinforcing ply being the smallest and the outermost reinforcing ply the largest (for example, reinforcing ply 32 and reinforcing ply 38, respectively, of FIG. 2).

Each individual reinforcing ply 46 is coaxially disposed about the longitudinal axis of the composite hose. With this disposition, the filament yarns of each individual reinforcing ply 46 have a predetermined orientation with respect to radial planes through the longitudinal axis of the composite hose. The predetermined orientation corresponds to the predetermined angle 52 produced by the section line cuts 48, 48, thereby providing the requisite degree of longitudinal flexibility.

Figure 4:
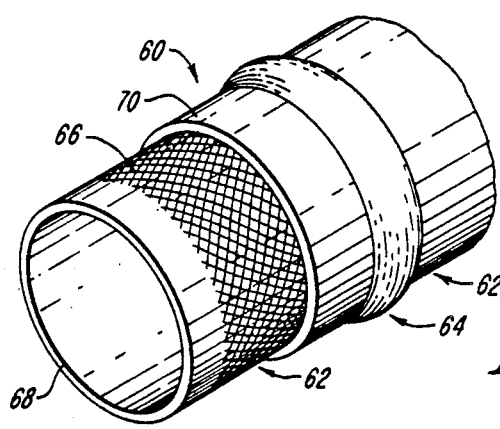
FIG. 4 is a partial perspective view of an exemplary embodiment of a shaped composite hose according to the present invention

Another exemplary embodiment of a composite hose according to the present invention is depicted in FIG. 4. The composite hose 60 of FIG. 4 is a shaped hose which includes first and second tubular sections 62, 62 and a convoluted section 64 therebetween. The shaped composite hose 60 includes layers of high performance elastomer 68, 70 bonded to the inner and outer surfaces of an intermediate reinforcing ply of balanced fabric 66 generally as described hereinabove.

The first and second tubular sections 62, 62 have constant inner and outer diameters. The exemplary convoluted section 64 consists of a single arcuate portion having inner and outer diameters equal to the first and second tubular sections 62, 62 at the interfaces therewith and greater than the first and second tubular sections 62, 62 over the remainder of the convoluted section 64. It is to be understood that shaped composite hoses according to the present invention may have configurations other than that exemplarily illustrated. For example, the convoluted section may include multiple arcuate portions such that the convoluted section has inner and outer diameters which are less than, equal to, and greater than the inner and outer diameters of the tubular sections.

A variety of modifications and variations of the present invention are possible in light of the above teachings. It is therefore to be understood that within the scope of the appended claims, the present invention may be practiced otherwise than as specifically described hereinabove.

What is claimed is:

1. A high performance composite hose for use in high pressure, high temperature and high vibrational environments, said high performance composite hose having a longitudinal axis, comprising:

at least two plies of balanced fabric in tubular form disposed coaxially to define the longitudinal axis of said high performance composite hose, each ply of balanced fabric being formed of warps and wefts of high performance filament yarn as a balanced fabric sheet having comparable break strengths in warp and weft, said balanced fabric sheet being sectioned at a predetermined angle having a value in the range of about 39° to about 45° to said warp and weft of said high performance filament yarn to form each said ply of balanced fabric, said high performance filament yarn of each said balanced fabric ply orientated at said predetermined angle with respect to the longitudinal axis defining said high performance composite hose; and a layer of high performance elastomer bonded to each inner and outer surface of each said ply of balanced fabric in tubular form to form said high performance composite hose wherein said high performance composite hose has an outer layer of high performance elastomer;

each said ply of balanced fabric being treated with a priming agent to ensure substantially complete and uniform bonding of each said layer of high performance elastomer to each said inner and outer surface of each said ply of balanced fabric.

2. The high performance composite hose of claim 1 wherein said predetermined angle is 45 degrees.

3. The high performance composite hose of claim 1 wherein each said layer of high performance elastomer is selected from a group of high performance elastomers comprising silicone elastomers, ethylene-propylene monomer elastomers, ethylene-propylene-diene monomer elastomers, ethylene-acrylic elastomers and fluorinated elastomers.

4. The high performance composite hose of claim 1 wherein each said layer of high performance elastomer bonded to each said inner and outer surface of each said ply of balanced fabric is a silicone elastomer.

5. The high performance composite hose of claim 1 wherein said high performance filament yarn forming each said ply of balanced fabric comprises an aramid filament yarn.

6. The high performance composite hose of claim 5 wherein said aramid filament yarn comprises polyamide fibers.

7. The high performance composite hose of claim 1 wherein said filament yarn for said warps and wefts forming said at least one ply of balanced fabric comprises a first aramid filament yarn for said warps and a second aramid filament yarn for said wefts.

8. The high performance composite hose of claim 1 wherein said innermost layer of high performance elastomer is adhered to said innermost ply of balanced fabric by skim coating.

9. The high performance composite hose of claim 1 wherein said at least two plies of balanced fabric comprises more than two plies of balanced fabric each having a tubular form, said more than two plies of balanced fabric being coaxially disposed to define the longitudinal axis of said high performance composite hose in concentric relationship with respect to each other, and wherein each ply of said more than two plies of balanced fabric has said layer of high performance elastomer bonded to said inner and outer surfaces thereof to form said high performance composite hose.

10. The high performance composite hose of claim 9 wherein said innermost layer of high performance elastomer is bonded to said innermost concentric ply of balanced fabric by skim coating.

11. The high performance composite hose of claim 9 wherein said more than two plies of balanced fabric comprises a whole real number in the range from three to eight.

12. The high performance composite hose of claim 9 wherein said more than two plies balanced fabric comprises three plies of balanced fabric.

13. The high performance composite hose of claim 9 wherein said more than two plies of balanced fabric comprises four plies of balanced fabric.

14. A high performance shaped composite hose for use in high pressure, high temperature and high vibrational environments, said high performance composite hose having a longitudinal axis, comprising:

at least two plies of balanced fabric in tubular form disposed coaxially to define the longitudinal axis of said high performance shaped composite hose, each ply of balanced fabric being formed of warps and wefts of high performance filament yarn as a balanced fabric sheet having comparable break strengths in warps and weft, said balance fabric sheet being sectioned at a predetermined angle having a value in the range of about 39° to about 45° to said warp and weft of said high performance filament yarn to form each said ply of balanced fabric, said high performance filament yarn of each said ply of balanced fabric orientated at said predetermined angle with respect to the longitudinal axis defining said high performance shaped composite hose;

said tubular form of said at least twice plies of balanced fabric including at least one tubular section having a uniform diameter over the length thereof, and at least one convoluted section of at least one arcuate portion having a varying diameter along the length thereof; and a layer of high performance elastomer bonded to each inner and outer surface of each said ply of balanced fabric in tubular form wherein said high performance shaped composite hose has an outer layer of high performance elastomer;

each said ply of balanced fabric being treated with a priming agent to ensure substantially complete and uniform bonding of each said layer of high performance elastomer to each said inner and outer surface of each said ply of balanced fabric.

15. The high performance shaped composite hose of claim 15 wherein said two plies of balanced fabric comprises more than two plies of balanced fabric each having a tubular form, each of said plies of balanced fabric being coaxially disposed to define the longitudinal axis of said high performance composite hose in concentric relationship with respect to each other, and wherein each said ply of balanced fabric has said layer of high performance elastomer bonded to each said inner and outer surface thereof to form said high performance shaped composite hose.

16. The high performance shaped composite hose of claim 14 wherein said innermost layer of high performance elastomer is bonded to said innermost concentric ply of balanced fabric by skim coating.

17. The high performance shaped composite hose of claim 15 wherein said more than two lies of balanced fabric comprises a whole real number in the range from three to eight.

18. The high performance shaped composite hose of claim 17 wherein said more than two plies balanced fabric comprises three plies of balanced fabric.

* * * * *

UNITED STATES PATENT AND TRADEMARK OFFICE
CERTIFICATE OF CORRECTION

PATENT NO. : 4,989,643

DATED : February 5, 1991

INVENTOR(S) : James C. Walton, Thomas S. Moroney, William McNamara, Donald G. Morgan and Arunas T. Simkus It is certified that error appears in the above-identified patent and that said Letters Patent is hereby corrected as shown below:

Column 3, line 58, "adjacent reinforcing Plies" should read --adjacent reinforcing plies--.

Column 4, line 1, "convoluted sections" should read --convoluted sections.--

Column 4, line 61, "with each reinforcing Ply" should read --with each reinforcing ply--.

Column 5, line 49, "layers of high Performance" should read --layers of high performance--.

Column 6, line 50, "also a suitable filament Yarn" should read --also a suitable filament yarn--.

Column 9, line 37, "said at least twice" should read --said at least two--.

Column 10, line 17, "claim 15 wherein said" should read --claim 14 wherein said--.

Signed and Sealed this

Twenty-third Day of March, 1993

Attest:

STEPHEN G. KUNIN

*Attesting Officer*  *Acting Commissioner of Patents and Trademarks*